United States Patent [19]

Ingram

[11] Patent Number: 5,607,706
[45] Date of Patent: Mar. 4, 1997

[54] PRECONDITIONING PREFORMS ON A REHEAT BLOW MOLDING SYSTEM

[75] Inventor: Ronald W. Ingram, Toronto, Canada

[73] Assignee: Husky Injection Molding Systems Ltd., Canada

[21] Appl. No.: 416,954

[22] Filed: Apr. 5, 1995

[51] Int. Cl.$^6$ ................................................. B29C 49/64
[52] U.S. Cl. ............................................ 425/526; 264/535
[58] Field of Search ................................. 425/526, 143, 425/144, 534, 170; 264/535; 432/5

[56] References Cited

U.S. PATENT DOCUMENTS

| | | | |
|---|---|---|---|
| 3,079,637 | 3/1963 | Marzillier | 425/526 X |
| 4,063,867 | 12/1977 | Janniere | 425/526 |
| 4,140,464 | 2/1979 | Spurr et al. | 425/534 X |
| 4,224,263 | 9/1980 | Kontz | 425/526 X |
| 4,657,502 | 4/1987 | Rydmann | 425/526 |
| 4,793,960 | 12/1988 | Schad et al. | 264/535 |
| 4,853,171 | 8/1989 | Ajmera | 264/535 X |
| 5,066,222 | 11/1991 | Roos et al. | 432/5 |
| 5,206,039 | 4/1993 | Valyi | 425/534 X |
| 5,322,651 | 6/1994 | Emmer | 264/535 X |
| 5,326,258 | 7/1994 | Gittner et al. | 432/5 |

Primary Examiner—Richard L. Chiesa
Attorney, Agent, or Firm—Bachman & LaPointe, P.C.

[57] ABSTRACT

A system for preconditioning preforms prior to reheating the preforms for blow molding, includes an area for receiving finished preforms, a conveyor for moving the preforms from the area and to a blow molding operation, a reheat section connected with the conveyor for receiving the preforms and for heating the preforms in preparation for blow molding, and a preconditioning section for preconditioning the temperature of the preforms prior to distributing the preforms to the reheat section such that the heat energy contained by each preform is substantially the same and uniformly distributed throughout each preform.

17 Claims, 5 Drawing Sheets

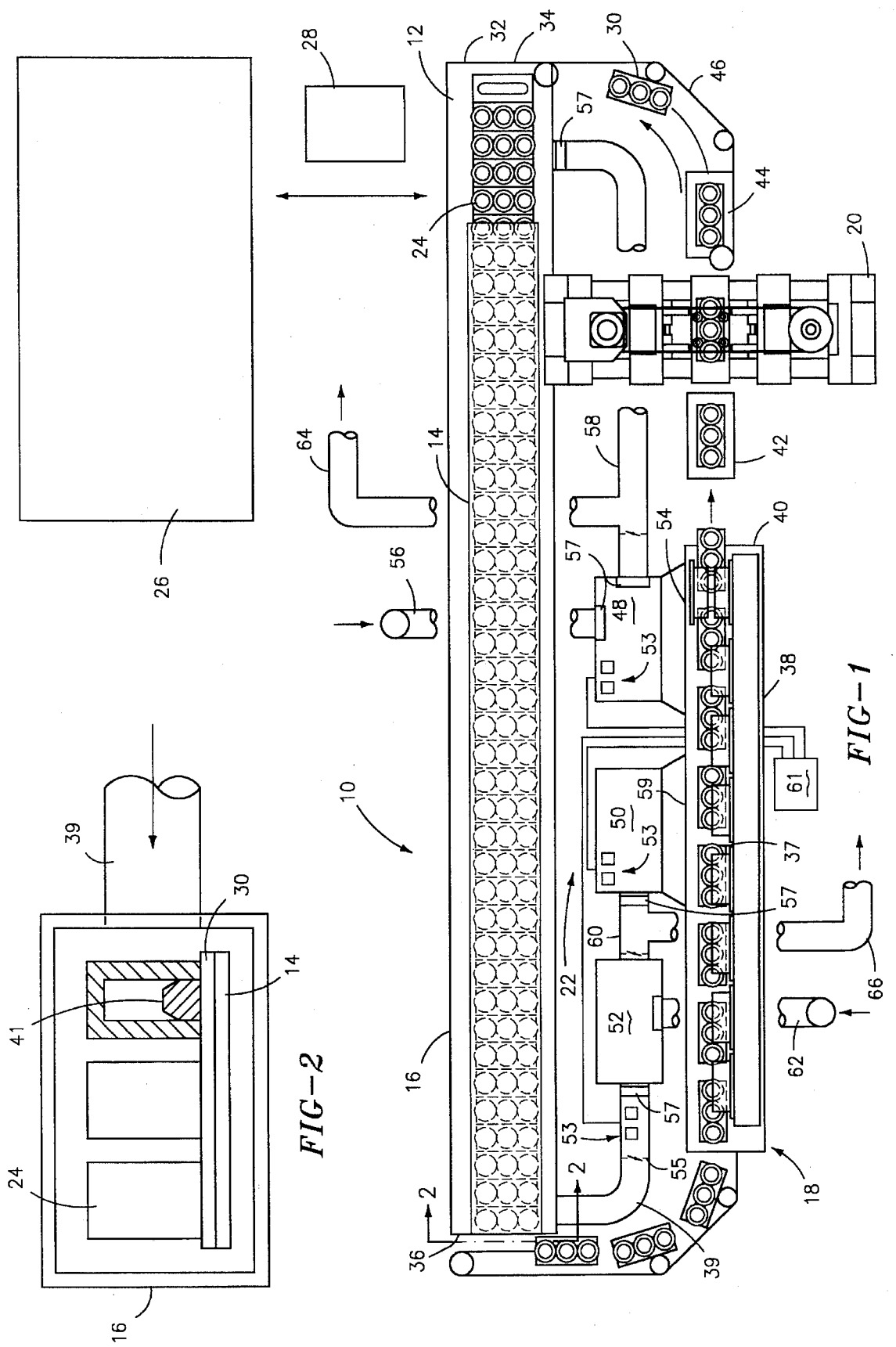

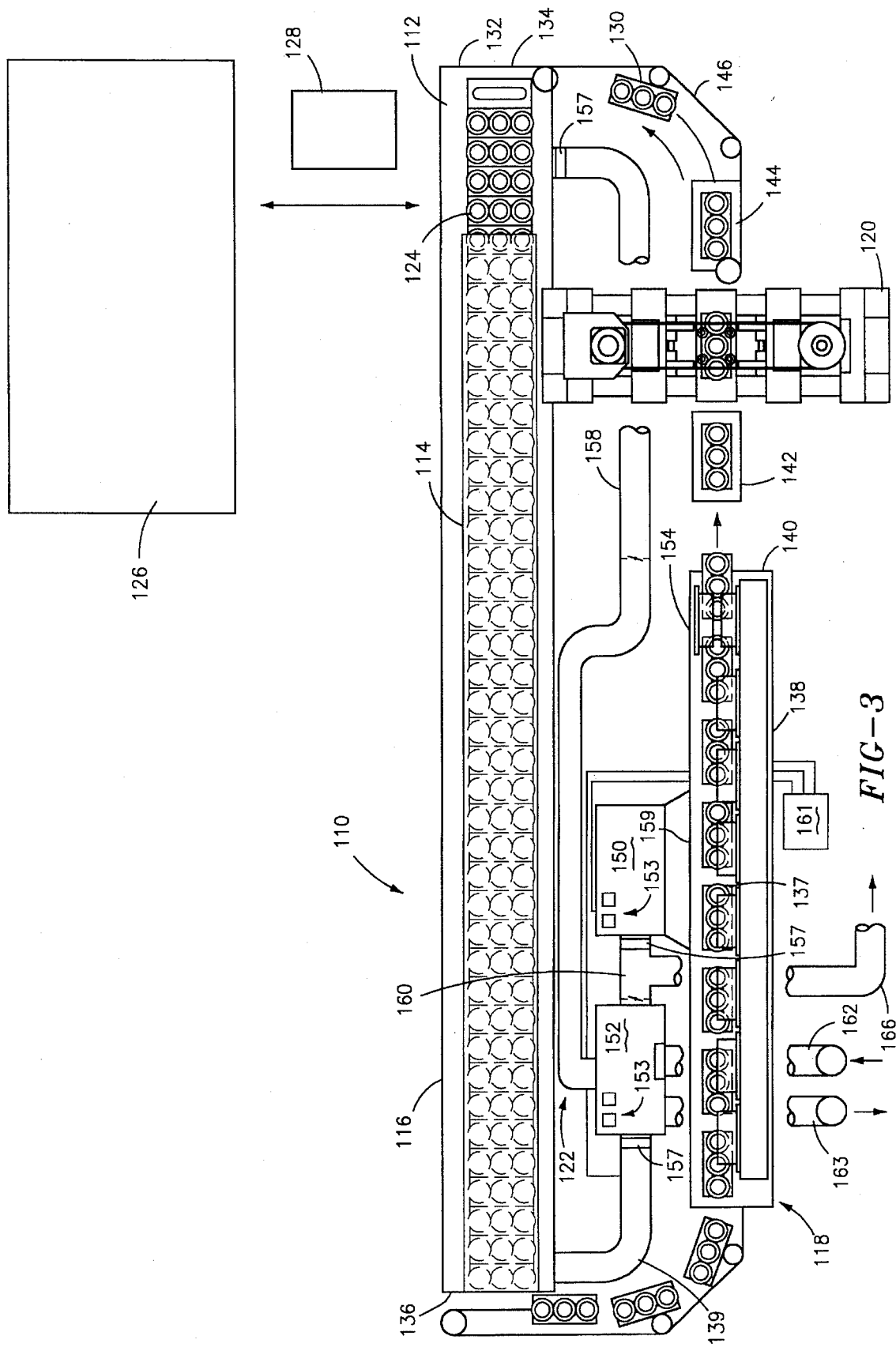

PRECONDITIONING PREFORMS ON A REHEAT BLOW MOLDING SYSTEM

BACKGROUND OF THE INVENTION

This invention is directed to blow molding systems, and more particularly to a blow molding system which preconditions preforms such that temperature distribution for each preform and among a plurality of preforms is uniformly distributed prior to reheating and blow molding.

One of the most critical process variables when blow molding some materials is the temperature of the preform as it is being blown. This variable often has a significant impact on the most important physical properties of the final blown article. It can also drastically affect productivity reducing the operating window of several other processing variables. Ideally the preform temperature should be as consistent as possible from one preform to the next in order to maximize production rates, maximize the final article's physical properties and minimize scrap. A temperature variation of up to 3° C. will generally have no adverse effects on the process. There have been various previous attempts to minimize this variability. Several of the most relevant ones are discussed below.

U.S. Pat. No. 5,322,651 (hereinafter '651) addresses the adverse effects of variations in ambient air temperature during the thermal treatment of preforms immediately prior to blowing into the final article. The '651 apparatus mixes ambient air with the re-circulating air in the oven to maintain the temperature of the air passing through the oven and over the preforms at a constant level. It does not address the adverse effects of variation in the amount of heat contained in the preforms during the day as shown in FIG. 2 of the '651 patent. Since in prior art two stage processes, preforms are generally injection molded hours or days before they are finally blow molded into their final shape and they are stored for a substantial period of time, their temperature will equilibrate to that of the ambient storage temperature. From FIG. 2 of the '651 patent it is obvious that preforms entering the reheat/blow stage can differ in temperature by up to 11° C. As described at the top of Column 2 of the '651 patent, prior art machines have used an infrared pyrometer to measure the surface temperature of the preforms. This measurement is then used to regulate the thermal processing of the preform. This apparatus claims to eliminate the need to adjust the infrared heat emitting sources in Column 4, lines 61 to 65. This is questionable since the amount of heat contained by the preform will vary during the day whereas the heat added to the preform will be constant since the heat emitting sources are adding the same amount of heat to each and every preform. This will result in varying heat content of the preforms exiting the conditioning ovens which is directly proportional to the ambient temperature variation during the day, producing product whose properties vary during the day.

U.S. Pat. No. 4,140,464 issued to Spurr et al. discloses an apparatus used to injection mold preforms. The preforms are removed at substantially their blowing temperature by a handling device and placed in a parison storage section where they are maintained at the blowing temperature until they are blown within the time frame of one injection molding cycle. Since the preforms are stored for a very short period of time, the inherent temperature variation from one preform to the next on removal from the injection mold will continue to be seen in preforms entering the blowing station.

U.S. Pat. No. 4,063,867 shows an apparatus with multiple sets of injection mold cores which support the preforms while they are moved from the injection molding station to a preblow station. The preforms are then moved to an oven where multiple sets of cores are stored for multiple injection molding cycles and finally to the blowing station. The preblown preforms are heated in an "oven" by blowing hot air over them while they are enclosed by an extension of the hot air supply duct. The purpose of the oven is to heat the preforms in preparation for the blowing station. The apparatus is assumed to equalize any variation in preform heat content since the preforms are "soaked" in the oven. This patent explicitly deals with uniformly heating individual preforms to the blowing temperature in an oven. It ignores the problem of variations in ambient temperature and the variation in heat content from one preform to the next, produced by each injection molding cycle.

U.S. Pat. No. 5,066,222 (hereinafter '222) to Roos et al. addresses the problems of uniformly heating a preform throughout its cross-section. It teaches heating the outside of the preform to a temperature below the blowing temperature; cooling the outside to prevent the outside from reaching a temperature above the blowing temperature while the inside wall continues to increase in temperature as a result of the heat added to and contained in the body of the preform from the first heating step; further heating the outside to a temperature above the blowing temperature, followed by a period where the outside and inside temperatures are allowed to converge to the desired blowing temperature. FIG. 2 of the '222 patent clearly shows that all the incoming preforms are at the initial temperature To.

The key to this method is the provision of time to allow the outside and inside temperatures of the preform to converge to a desired value by providing exterior cooling means for the preform while the inner surface continues to warm up. The teaching of this patent does not consider incoming preforms of varying temperatures or heat content. The assumption is that all incoming preforms are at the same temperature To. An incoming preform that is hotter or cooler than To will result in a curve similar to FIG. 2 of the '222 patent for that preform which is shifted by the difference between the actual incoming temperature of the preform and To. This means that the final temperature of the preforms entering the blow station will vary by this amount. As previously stated this difference can be up to 11° C. making it very difficult or impossible to produce consistently acceptable quality blown articles.

U.S. Pat. No. 5,206,039 to Valyi discloses a preform conditioning apparatus with a conditioning section before the blow molding machine. The conditioning section can consist of more than one conditioning station. In a preferred embodiment, at least one cooling and one heating station are required. The disclosed apparatus has discrete conditioning stations into which the entire output of an injection molding machine cycle are simultaneously placed. The entire output is then picked up again and moved simultaneously to the next station. Another transfer device removes a portion of the preforms from the second conditioning station into the blow station. Each time that preforms are moved, they are gripped by their necks. This repeated gripping, picking up, moving and releasing adds complexity to the apparatus and increases the probability of damage to the neck finish. Since the preforms are removed in groups which consist of fewer preforms than the number placed in the last conditioning station, each group will undergo different conditioning. This adds another variable to the process that is very difficult to compensate for. This apparatus also does not address the issue of variation in the heat content of the preforms entering the conditioning process. This process does not have the ability to correct the inherent variability of the temperature of incoming preforms.

U.S. Pat. No. 5,326,258 discloses a means to heat temperature sensitive preforms prior to blow molding. In this method, preforms are introduced first into an equalization section where they are "uniformly equalized throughout". They are then transported by a continuously moving conveyor through subsequent heating/cooling, temperature equalizing, surface treatment and tempering stages/stations. There is no explanation provided regarding the initial equalization section. Further, the equalizing refers to ensuring that each individual preform has a uniform temperature throughout its cross-section. This equalization allows the heat energy contained in each individual preform to dissipate throughout its entire mass. It does not address the problem of "equalizing" preforms of differing heat content due to differential cooling in an injection mold or variable ambient temperatures. This patent does not teach how this equalization is done. The figure appears to provide inadequate means to achieve the equalization required to ensure uniform temperatures across all preforms and within each preform.

There exists therefore, a need for a blow molding system which includes a preconditioning section for insuring uniformity in temperature distribution among all preforms moved through the system.

SUMMARY OF THE INVENTION

The primary object of this invention is to provide a blow molding system including a preconditioning section for insuring uniformity of temperature distribution for all preforms sent through the system.

Another object of this invention is to provide a blow molding system wherein low grade waste heat given off by a reheat section is incorporated into a preconditioning section for preconditioning the temperature distribution of preforms.

Another object of this invention is to provide a blow molding system wherein waste heat can be used to preheat preforms as part of a preconditioning step in order to reduce the amount of heat energy that must be applied in a reheat/temperature profile section, making the entire system more energy efficient.

Yet another object of this invention is to provide a blow molding system which reduces equilibration time for preforms therein while increasing energy efficiency.

Still another object of this invention is to provide a blow molding system wherein the heat content of preforms entering the system is relatively more consistent than prior art systems.

And yet another object of this invention is to provide a blow molding system having minimized air conditioning requirements for preconditioning preforms via the use of an air flow regulation system.

Still another object of this invention is to provide a blow molding system which causes preforms to be less thermally sensitive to environmental influences such as seasonal temperature fluctuations.

The foregoing objects are attained by the blow molding system of the instant invention which includes a system for preconditioning preforms prior to reheating the preforms for blow molding. The system comprises an area for receiving finished preforms, conveying means for moving the preforms from the area and to a blow molding operation, a reheat section means connected with the conveying means for receiving the preforms and for heating the preforms in preparation for blow molding, and means for preconditioning the temperature of the preforms prior to distributing the preforms to the reheat section means. The preconditioning means acts on the preforms such that the heat energy contained by each preform is substantially the same and uniformly distributed throughout each preform.

In one embodiment, the means for preconditioning comprises an air tunnel positioned adjacent the conveying means and upstream of the reheat section means, which is adapted to receive air and direct air flow against the preforms. In this embodiment, the system further includes means for establishing and regulating air flow between the means for preconditioning and the reheat section means.

The details of the present invention are set out in the following description and drawings wherein like reference characters depict like elements.

BRIEF DESCRIPTION OF THE DRAWINGS

FIG. 1 is an overhead view of the blow molding system of the instant invention including the preform set down area, the preconditioning section, the reheat section, and a removal section.

FIG. 2 is a side elevational view taken along line 2—2 of FIG. 1 showing the preconditioning section of the instant invention.

FIG. 3 is an overhead view of an alternative embodiment of the blow molding system of the present invention.

DETAILED DESCRIPTION OF THE PREFERRED EMBODIMENT

Figure 4:
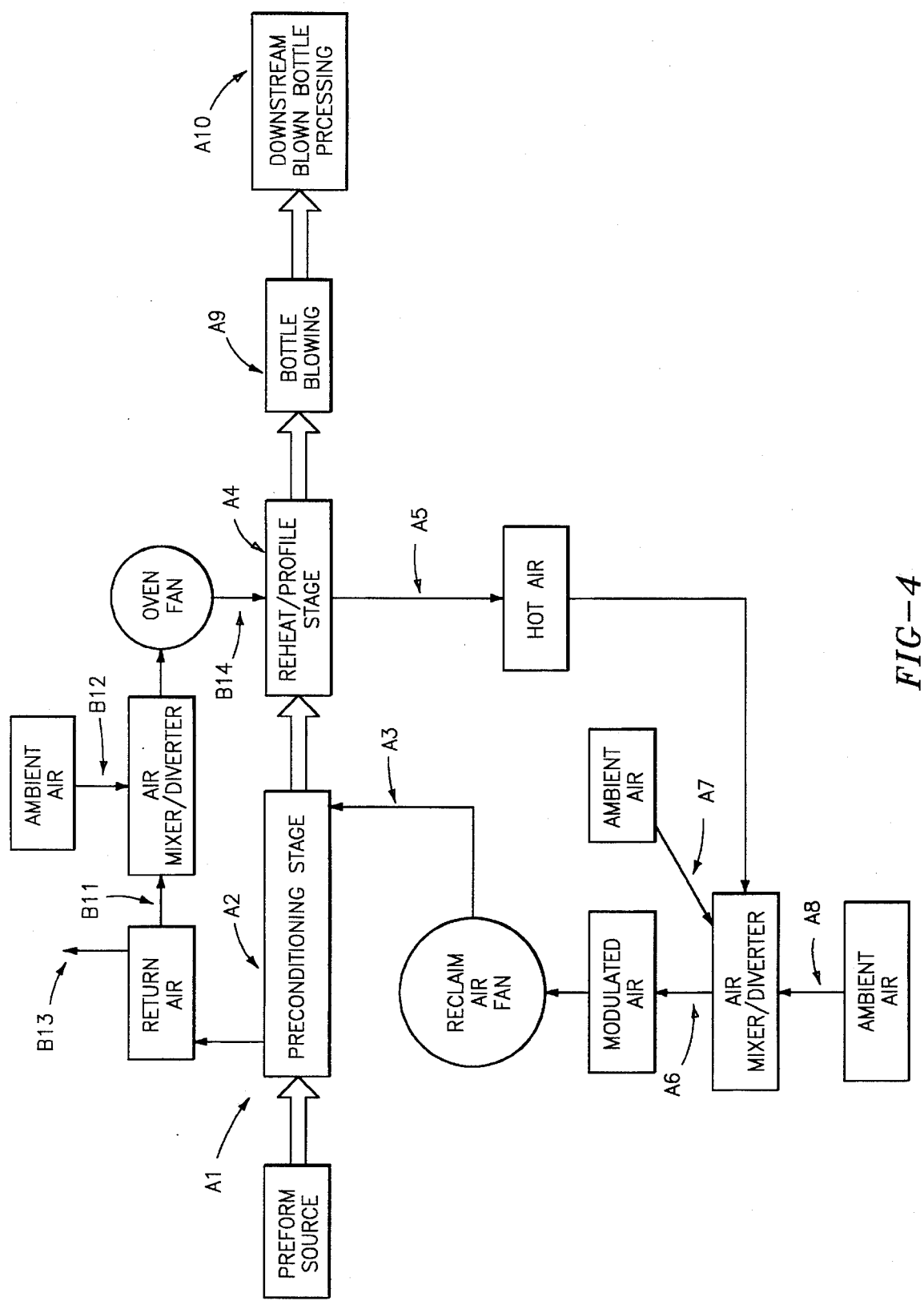
FIG. 4 is a schematic representation of preform and air flow of the system of the present invention shown in FIG. 1.

Referring now to the drawings in detail, there is shown in FIG. 1 an overhead view of the reheat blow molding machine of the present invention, designated generally as 10. The reheat blow molding machine generally includes a set down area 12 for the reception of finished preforms, a conveying mechanism 14 for moving the preforms through a temperature preconditioning section 16 and onward to a reheat section 18. Machine 10 further includes a blow molding section 20 receiving preforms from the reheat section and an air handling system 22 for establishing and regulating air flow, which provides air in the appropriate mixtures and temperatures for the various sections of the machine.

At set down area 12, machine 10 is adapted to receive finished preforms 24 from a source 26 which may be in the form of, for example, an injection molder or an inventory supply device. Preforms 24 are moved from preform source 26 via a product handling device 28 which may be in any conventional form. Accordingly, preforms 24 are provided to set down area 12 for movement through preconditioning section 16.

Set down area 12 is an entrance area for the preforms wherein pallets 30 receive preforms 24 from product handling device 28. After each pallet 30 is preferably filled with preforms, pallet 30 is moved via conveying mechanism 14 through the preconditioning section 16. Set down area 12 is preferably completely enclosed via an enclosure 32 so as to reduce any initial variations in heat content and temperature of preforms 24. The enclosure preferably opens for a period of time long enough for product handling device 28 to place preforms 24 onto one or more pallets 30. The opening mechanism may be in the form of a sliding door (not shown) which temporarily provides access to the set down area 12. The enclosure insures that all preforms are initially subjected to the same conditions, unlike the prior art where the last preform placed on the last pallet for entrance to the reheat ovens of the system, is cooled in ambient air for almost a complete injection molding cycle longer than the first preform on the first pallet. After loading on set down area 12, preforms 24 are conveyed via conveying mechanism 14 through preconditioning section 16.

Referring to both FIG. 1 and FIG. 2, preconditioning section 16 is preferably an enclosure enclosing the bottom, sides and top of preforms 24 on conveying mechanism 14. Ends 34 and 36 of conveying mechanism 14 are open so as to allow entrance and exit of pallets 30. Preconditioning section 16 receives preconditioned air from air handling system 22 through a duct 39 or the like. The air received through duct 39 into preconditioning section 16 is preferably at a uniform temperature and is provided for use for preconditioning by air handling system 22. The air is preferably blown or otherwise moved through preconditioning section 16, entering at end 36 and exiting at end 34. Other air flow paths could also be utilized. While the air is moved through preconditioning section 16, preforms 24 are preferably rotated on mandrels 41 located in pallets 30, as shown in FIG. 2. The air is blown or otherwise moved through this air tunnel formed by preconditioning section 16 via conventional methods, ensuring that both volume and particularly incoming temperature are constant as the air flow passes over the preforms. The preforms are preferably rotated as they move through preconditioning section 16. The preforms are rotated (occasionally or continuously) while moving through the preconditioning section 16, to ensure conditioning of all surfaces.

The turbulent air flow supplied to preconditioning section 16 is at a substantially constant temperature entering section 16 and functions to insure that the heat energy contained by each preform is preferably substantially the same as other preforms; that the heat energy is uniformly distributed through each individual preform; and that the temperature of each preform preconditioned is preferably within 0° to 5° C. of all other preforms preconditioned, and more particularly within 0° to 3° C. of all other preforms preconditioned. The air entering section 16 is at a temperature between ambient and the blowing temperature, depending on the desired temperature and the amount of available waste heated air coming from reheat section 18. This reduces the amount of heating required at reheat section 18. Accordingly, at the exit end 36, every preform moving on to reheat section 18 includes substantially the same amount of heat energy as every other preform exiting end 36 while also having uniformly distributed heat energy. Exit end 36 should be as close as possible to the entrance of reheat section 18 to avoid unwanted influence of ambient conditions on preform temperature.

The exact velocity of the air flow through preconditioning section 16 is not critical so long as it is consistent and turbulent. Preferably, the volumetric air flow is constant and counter to the direction of movement of the preforms, although other air flow paths could also be employed. For economical reasons, it is preferable that a source of low grade heat is used to preheat the preforms in preconditioning section 16 to a temperature substantially above ambient temperature but substantially below their blowing temperature. This low grade heat is preferably provided from, as discussed in more detail below, reheat section 18 via air handling system 22. When exiting exit end 36, pallets 30 with preconditioned preforms 24 are moved onto reheat section 18.

In reheat section 18, the preform temperatures are increased to the desired blow molding temperature, and they may also be profiled by any one of a number of prior art methods. Reheat section 18 is preferably comprised of a plurality of infrared lamps 37 to heat the preforms as they pass through the reheat section, rotating about their longitudinal axis on pallets 30. Since the energy transferred to preforms 24 in reheat section 18 is generally substantially lower than the energy provided to the reheat section for heating the preforms, the components making up reheat section 18 are also heated. If this excess heat were allowed to accumulate, overheating and damage to the components of the reheat section and preform surfaces would result. The excess heat is removed from the reheat section via air handling system 22 and is preferably used, as discussed above as the low grade heat source for preconditioning the temperature of preforms 24 in preconditioning section 16. The excess heat of reheat section 18 is preferably collected in an enclosure 38, shown in FIG. 1. The excess heat is actively drawn away from enclosure 38 via air handling system 22.

Preforms 24 on pallets 30 exit reheat section 18 at end 40, as shown in FIG. 1, where the preforms are then allowed to equilibrate, as is known in the art, in equilibration section 42 before they enter blow molding section 20 where the preforms 24 are blow molded into the desired form. After blow molding section 20, blown preforms 24 on pallets 30 are preferably moved to a stripper section 44, where preforms 24 are removed from pallets 30. The empty pallets are then returned along path 46 to set down area 12 where pallets 30 are adapted to receive another set of preforms 24 from product handling device 28.

Air handling device 22, as described briefly above, is used to regulate the flow of air to and from the various sections, i.e. set down area 12, preconditioning section 16, and reheat section 18, and also to mix system air with ambient air to individually and independently regulate the air temperature supplied to each section. Air handling system 22 includes a plurality of enclosures 48, 50 and 52 and ducts maintaining many of the sections of system 10 in fluid communication.

Each enclosure 48, 50 and 52 and/or in between air flow ducts have a conventional design comprising temperature and air flow sensors 53, control baffles 55 and/or variable or fixed output fans 57 and a controller 61 connected with sensors 53. The system senses conditions, determines deviation from desired check points, determines the required corrections and issues control signals to the active elements to cause a correction in the temperature, air flow, and other parameters of the air. The arrangement of fans, baffles and sensors shown in FIG. 1 is by way of example only, wherein different arrangements may be used as necessary for different conditions desired.

Enclosure 48 has one substantially open side 54 connected in fluid communication with reheat section 18. Ducts 56 and 64 connect enclosure 48 with ambient air and duct 58 connects enclosure 48 with enclosure 32 of the set down area 12. Air is preferably removed from set down area 12 via conventional methods such as fans or vacuums or the like and the air is moved through duct 58 into enclosure 48.

Ambient air is drawn from the surroundings from duct 56 via one of fans 57 and mixed in enclosure 48 with the air drawn from enclosure 32 of the set down area 12. Excess air in duct 58 from enclosure 32 is vented to the atmosphere via duct 64, if the air from enclosure 32 is too warm for reheat section 18 due to the conditions at set down area 12 and the required conditions for reheat. Accordingly, the air within enclosure 48 is conditioned prior to its input into reheat section 18 based on the air conditioning requirements of reheat section 18, for preventing overheating of the elements of reheat section 18 on the preform surfaces. The conditioning of the air within enclosure 48 is accomplished via the use of the elements discussed above including the inner mechanism of the air handling system 22.

Enclosure 50 is in communication with reheat section enclosure 38 via open side 59 which is preferably attached in an air tight manner to the top of enclosure 38. The excess heat within enclosure 38 of reheat section 18 is removed by one of fans 57 of enclosure 50, under the supervision of the temperature and air flow sensors 53, baffles 55 and the controller 61, and moved into enclosure 52 through duct 60. Enclosure 52 is in communication with ambient air preferably through duct 62 drawing on ambient air for mixing the excess heat from reheat section 18 therewith for acquiring the necessary conditions of the air in terms of temperature and the like for preconditioning section 16, as determined by the temperature and air flow sensors 53 arranged within enclosure 52.

The heat removed via at least one of fans 57 from reheat section 18 via enclosure 50 and moved into enclosure 52, is preferably mixed with ambient air from duct 62, wherein the necessary conditions of the air are acquired by use of the control elements therein. When ambient air from 62 is introduced into enclosure 52, some of the heated air from enclosure 38 must be expelled to atmosphere in order to maintain a constant volumetric flow of air at a desired temperature. This excess air is expelled via duct 66 prior to entering enclosure 52. The influx of heated air and ambient air and the expulsion of excess heated air can be regulated to maintain the optimal air conditions for preconditioning. The properly preconditioned air is then forced or blown via a fan 57 into duct 39 and back into preconditioning section 16. The air is then forced through preconditioning section 16 in and between preforms 24 in a turbulent fashion and dispensed at exit end 34 through duct 58 to continue the process, as described above.

An alternative embodiment is shown in FIG. 3, wherein like numerals between embodiment 10 and embodiment 110 are intended to designate like elements, wherein embodiment 110 has a description similar to that of embodiment 10 described above. Differences in the embodiments are discussed below. Duct 158 runs directly from enclosure 132 of set down area 112 to enclosure 152. Enclosure 48 and ducts 56 and 64 have been removed. That is, where conditioning of air entering enclosure 138 is not required, duct 158 feeds air from enclosure 112 directly into enclosure 152. In this embodiment, ambient air can be drawn into enclosure 138 through openings (not shown) in the bottom of enclosure 138. Enclosure 152 may also include an additional expulsion duct 163. All other features are substantially as described above for FIG. 1.

The operation of the embodiments of FIGS. 1 and 3 is described below with reference to the flow diagrams shown in FIGS. 4 and 5. Differences in the operations among the two embodiments are specifically indicated below for the embodiment of FIG. 1 with reference only to FIG. 4 and for the embodiment of FIG. 3 with reference only to FIG. 5. The solid black arrows represent air movement through the system and the hollow arrows represent the movement of the plastic articles through the system. Unless otherwise indicated, the number and letter designations for the embodiment of FIGS. 1 and 4 refer also to the similarly designated elements of the FIGS. 3 and 5 embodiment.

In step A1, set down area 12 receives finished preforms 24 from preform source 26 via product handling device or source 28 and air is removed from the set down area. The removed air from set down area 12 is handled differently for each embodiment and such differences are discussed specifically in later paragraphs. In step A2, the finished preforms 24 are moved through the preconditioning stage in section 16 via conveying mechanism 14 wherein the reclaimed and preconditioned air from air handling system 22 is preferably forced via a fan or the like in a turbulent manner, between preforms 24 in step A3. Through the introduction of air in a condition necessary for achieving uniform conditioning of the preforms, the preforms are caused to achieve heat energy which is substantially the same among all preforms; heat energy which is uniformly distributed through each individual preform; and a temperature of each preform which does not vary more than 0° to 3° C. from every other preform.

After being preconditioned, in step A4, preforms 24 on pallets 30 are sent into the reheat/profile stage via reheat section 18 where the preforms are heated to a blow molding temperature. Damage to the preform surface from overheating is avoided by the use of air handling system 22 extracting excess hot air in step A5 from enclosure 38 of reheat section 18 at a rate which still allows preforms 24 to heat to the required temperature for blow molding.

During the reheating of the preforms in both embodiments, excess heat is formed in enclosure 38 which is removed by air handling system 22 to avoid damage to the surface of the preforms and to the components of the reheat section. Heated air is removed from reheat section 18 in step A5 via open side 59 of enclosure or air mixer/diverter 50 wherein the sensors 53, as described above, determine the conditioning needed to be done to the heated air for use in the preconditioning section. In step A6, the air is then preferably moved through duct 60 into enclosure 52 wherein ambient air is mixed therewith in step A7 via duct 62 and as necessary for meeting the preconditioning parameters, creating a properly modulated air mixture. In order to maintain a balanced flow of modulated air, the excess hot air coming from enclosure 50 may be expelled to ambient in step A8 through a discharge vent 66. Once the parameters are met, air is forced or blown through duct 39 in the preconditioning state and into preconditioning section 16 between the preforms, as described above for step A3.

After reheating in reheat section 18, preforms are moved to equilibration section 42 to allow to equilibration, as is known in the art, before being moved to the bottle blowing section 20, in step A9. The preforms are blow molded into the appropriate form and in step A10, are subsequently stripped away from pallet 30 for downstream bottle processing and so that pallet 30 may enter set down area 12 in a condition for receiving more preforms.

As mentioned above, air handling system 22 functions to condition and distribute air among and between the various sections in a slightly different manner for each embodiment.

Figure 5:
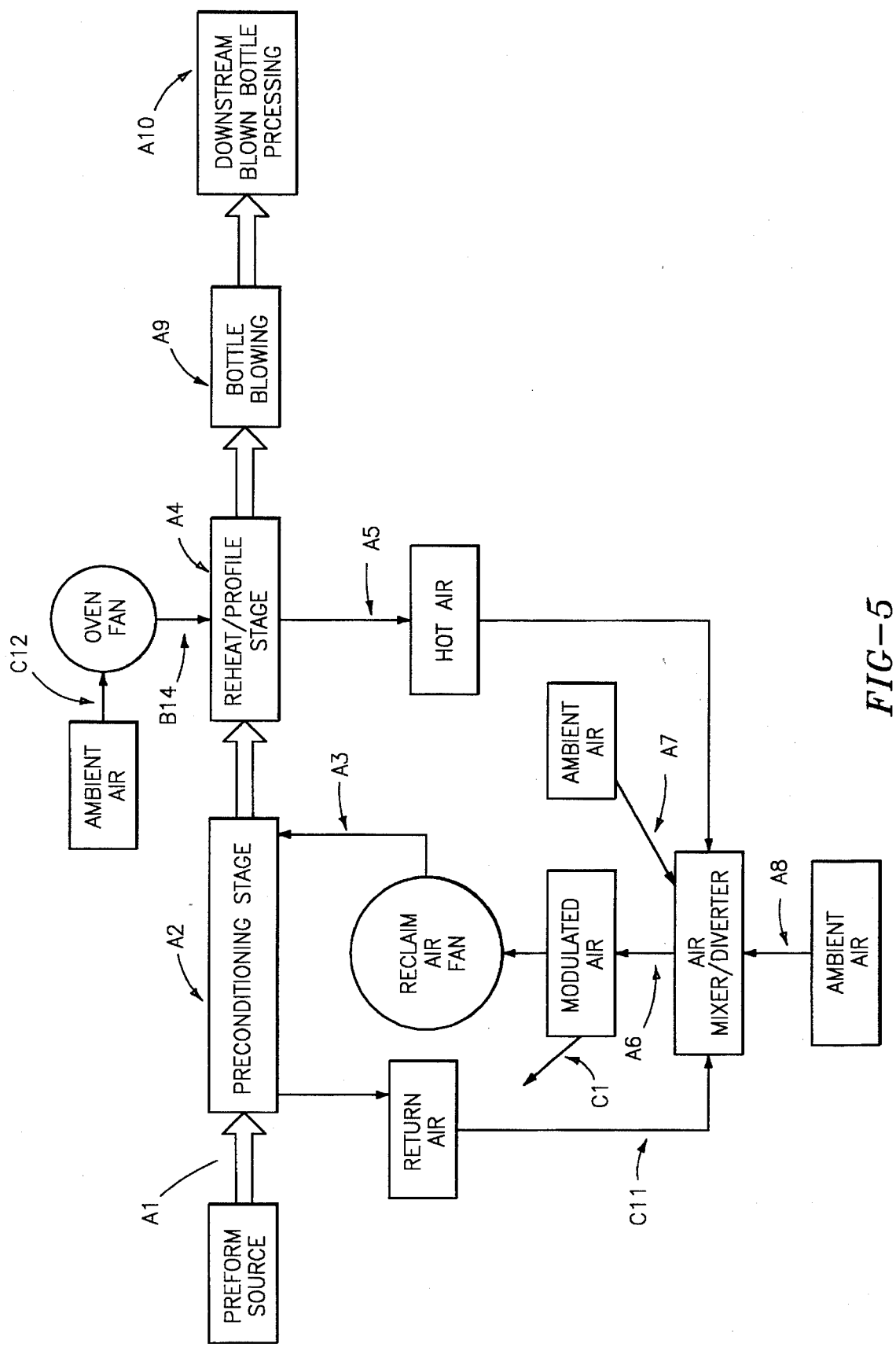
FIG. 5 is a schematic representation of preform and air flow of the system of the present invention shown in FIG. 3.

For the FIG. 1 embodiment only and with reference to FIG. 4, while the preforms are moving through the system, air is preferably removed and returned from set down area 12 in step A1, discussed above, via duct 58, and moved into air mixer/diverter or enclosure 48 in step B11 where the air is preferably mixed in step B12 with ambient air acquired through duct 56. In order to maintain an air balance, some of the air from set down area 12 is expelled into the atmosphere via a discharge unit 64 in step B13. Accordingly, in step B12 the air is mixed to acquire the desired condition of the air for introduction into reheat section 18. Such air conditioning is accomplished via the active elements within enclosure 48 such as the temperature and air flow sensors 53, controlled baffles 55 and/or fans 57, and a controller 61 which function together to sense conditions, determine deviations from the desired conditions, determine the required corrections and issue control signals to activate the appropriate elements to cause the correction. Upon the proper conditioning of the air, in step B14 the air is forced via a fan 57 or the like into enclosure 38 of reheat section 18 through open side 54 of enclosure 48. Steps B11–B14 occur substantially simultaneous to steps A1–A10. After step B14, the process resumes at step A5, discussed above.

For the FIG. 3 embodiment where conditioning of air entering enclosure 138 is not required, as discussed above, and referring to FIG. 5, in step C11 duct 158 feeds return air from enclosure 132 directly into enclosure 152. In this case, ambient air is drawn into enclosure 138 only through openings (not shown) in the bottom of enclosure 138 in step C12.

As with the FIG. 1 embodiment, air conditioning is accomplished via the active elements within the enclosures such as the temperature and air flow sensors 153, controlled baffles 155 and/or fans 157, and a controller 161 which function together to sense conditions, determine deviations from the desired conditions, determine the required corrections and issue control signals to activate the appropriate elements to cause the correction.

For this embodiment, enough hot air from the reheat section 118 during step A5 is mixed in enclosure 152 to maintain a constant temperature entering duct 139. The rest of the hot air is expelled into the atmosphere through duct 166 during step A8. This is accomplished by operating the damper in duct 160 to divert the excess hot air or by other means. The fan 157 in duct 160 would be drawing a constant flow of air from the reheat section to minimize variation within the reheat section. The air entering enclosure 152 from duct 158 in step A6 will typically be cooler than the desired air temperature in duct 139. This is particularly true when the preconditioning temperature and air from step C11 is significantly higher in temperature relative ambient. On the other hand, if the preconditioning temperature is at or near ambient and preforms are taken directly from an injection molding machine or other source of "warm" preforms, then the air in duct 158 during step C11 would be hotter than the desired air temperature in duct 139. This would require the expulsion of all the air, via step A5, coming from enclosure 150 through duct 166 as well as some of the air from duct 158 through duct 163 in step C13, causing the desired modulated air mixture and the introduction of ambient air via duct 162, in step A7, within enclosure 152.

Figure 6:
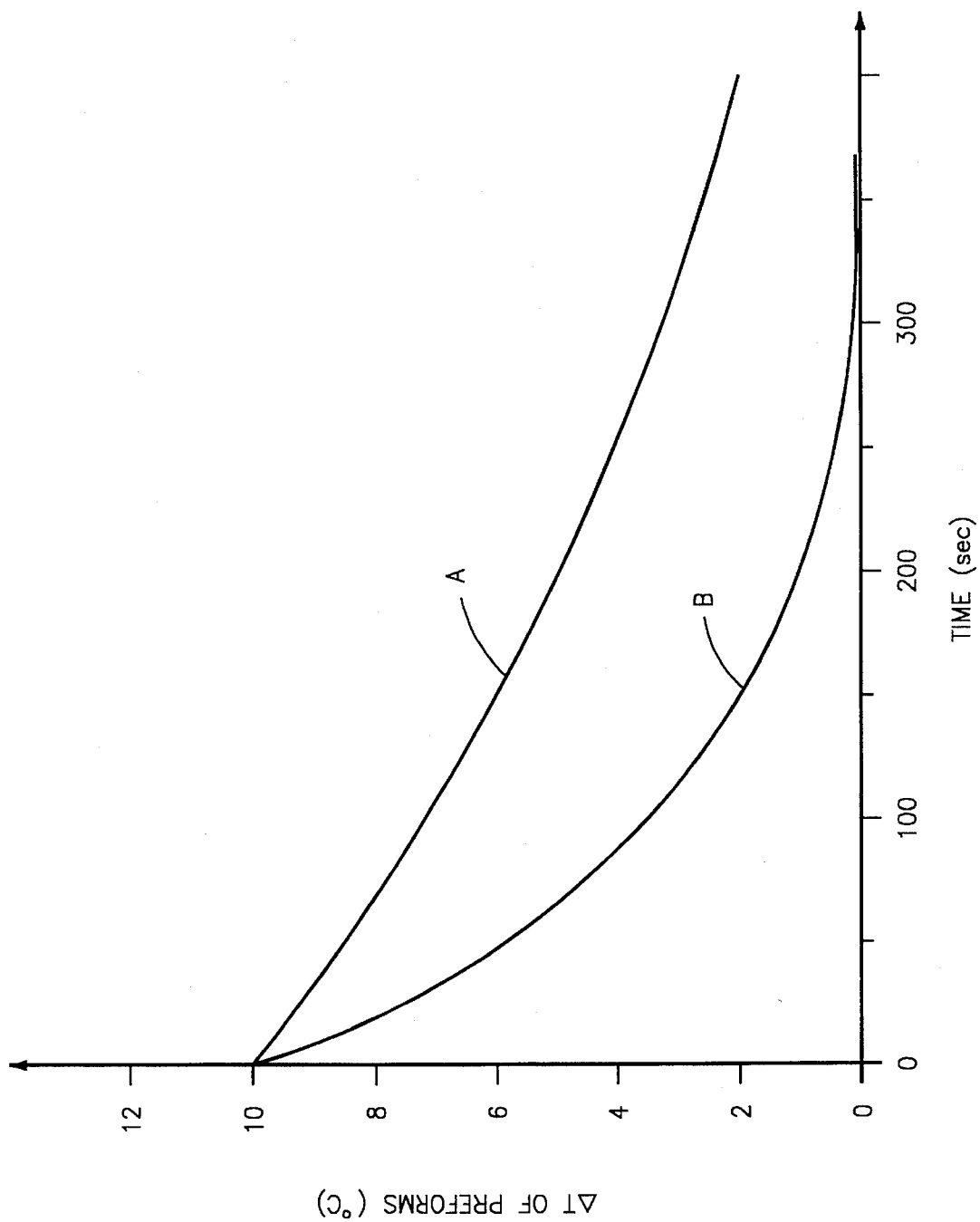
FIG. 6 is a graph representing the beneficial effects of cooling preforms in turbulent air as opposed to cooling preforms in ambient still air.

Referring now to FIG. 6, the graph therein shows temperature convergence of preforms with an initial temperature difference of approximately 10° C. under two conditions. Curve A shows that the time required to bring the temperature difference to 2° C. is approximately 400 seconds or 6 to 7 minutes in still air, i.e. without a preconditioning step. Curve B shows that a 2° C. difference can be obtained in approximately 150 seconds or 2½ minutes with the instant invention, using the preconditioning section. This reduces the inventory of preforms and the required size of the preconditioning section to achieve the desired temperature difference.

The primary advantage of this invention is that a blow molding system is provided including a preconditioning section for insuring uniformity of temperature distribution for all preforms sent through the system. Another advantage of this invention is that a blow molding system is provided wherein low grade waste heat used in a reheat section is incorporated into a preconditioning section for equilibrating the temperature of preforms to a desired value prior to reheating to blowing temperature. Yet another advantage of this invention is that a blow molding system is provided which reduces equilibration time for preforms. And yet another advantage of this invention is that a blow molding system is provided with increased energy efficiency. Still another advantage of this invention is that a blow molding system is provided wherein the heat content of preforms entering the system is relatively more consistent than prior art systems. And yet another advantage of this invention is that a blow molding system is provided having minimized air conditioning requirements for preconditioning preforms via the use of an air flow regulation system. And still another advantage of this invention is that a blow molding system is provided which causes preforms to be less thermally sensitive to environmental influences such as seasonal temperature fluctuations.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A system for preconditioning preforms, said preforms for subsequent blow molding, comprising:

an area for receiving finished preforms;

conveying means for moving said preforms from said area and to a blow molding operation; and means for heating said preforms for preconditioning the preforms downstream of said area and separate means for reheating said preforms to blow molding condition prior to blow molding and downstream of said preconditioning means;

wherein said means for heating is operative to precondition the temperature of said preforms prior to reheating said preforms for said subsequent blow molding and is operative to substantially equalize the temperature of said preforms, and wherein said preconditioning is defined by the heat energy contained by each preform being substantially the same and said heat energy being substantially uniformly distributed throughout each preform.

2. The system according to claim 1, wherein said means for preconditioning comprises a tunnel positioned adjacent a section of said conveying means which is adapted to receive air and direct air flow against said preforms prior to said reheating of said preforms, wherein said air flow causes the heat energy in said preforms to be uniformly distributed upon exiting from said preconditioning means.

3. The system according to claim 2, further comprising means for moving said air through said tunnel.

4. The system according to claim 3, further including means for creating turbulent air flow in said tunnel.

5. The system according to claim 4, wherein said means for creating turbulent air flow comprises a plurality of mandrels positioned on said conveyor means and adapted to engage and rotate said preforms to ensure uniform conditioning of all surfaces.

6. The system according to claim 1, further including a reheat section means downstream of said preconditioning means connected with said conveying means for receiving said preforms from said preconditioning means and for heating said preforms in preparation for said subsequent blow molding.

7. The system according to claim 6, further comprising means for establishing and regulating air flow between said means for preconditioning and said reheat section means.

8. The system according to claim 7, wherein said means for establishing and regulating connects said reheat section means to said preconditioning means in fluid communication, and includes means for directing excess heat resulting from reheating said preforms in said reheat section to said preconditioning means for use in assisting in preconditioning the temperature of said preforms.

9. The system according to claim 8, wherein said means for establishing and regulating is in further fluid communication with ambient air, said means for directing further for combining said ambient air with said excess heat for establishing the desired air temperature for uniformly preconditioning said preforms.

10. The system according to claim 6, wherein said reheat section means includes a plurality of infrared lamps.

11. The system according to claim 7, wherein said means for establishing and regulating comprises:

a duct extending between and connected to each of said reheat section and said means for preconditioning, said duct including a plurality of temperature and air flow sensor means for assisting in conditioning said air;

elements comprising at least one of controlled baffles and fans positioned in said duct for directing said air to said preconditioning means and for adjusting said air to acquire the desired conditions thereof; and a controller means connected with said sensor means for causing said baffles and fans to adjust said air conditions in dependence upon conditions sensed by said sensor means.

12. The system according to claim 11, wherein said duct is connected in fluid communication with ambient air, said elements adapted to mix said ambient air with said air to adjust said air into the proper condition for preconditioning said preforms.

13. The system according to claim 1, further comprising an enclosure positioned around said reheat section means for collecting excess heat generated by said reheat section means, wherein said enclosure is in fluid communication with said duct.

14. The system according to claim 1, wherein the maximum variation in temperature from one of said preforms to another of said preforms is maintained at 5° C. or less via said means for preconditioning.

15. The system according to claim 1, wherein said area for receiving includes an enclosure for maintaining said preforms under similar conditions, said enclosure adapted to be opened for receiving additional preforms.

16. The system according to claim 1, further comprising pallets for carrying said preforms on said conveying means.

17. The system according to claim 1, wherein the maximum variation in temperature from one of said preforms to another of said preforms is maintained at 3° C. or less via said means for preconditioning.

* * * * *